(12) United States Patent
Carothers et al.

(10) Patent No.: US 11,501,893 B2
(45) Date of Patent: Nov. 15, 2022

(54) ABRASION RESISTANT AND FLEXIBLE CABLE JACKET SYSTEMS

(71) Applicant: W. L. Gore & Associates, Inc., Newark, DE (US)

(72) Inventors: James Carothers, Newark, DE (US); Kim Ritchie, Newark, DE (US); John Dolan, Newark, DE (US)

(73) Assignee: W. L. Gore & Associates, inc., Newark, DE (US)

( * ) Notice: Subject to any disclaimer, the term of this patent is extended or adjusted under 35 U.S.C. 154(b) by 0 days.

(21) Appl. No.: 17/251,158

(22) PCT Filed: Jun. 15, 2018

(86) PCT No.: PCT/US2018/037730
§ 371 (c)(1),
(2) Date: Dec. 10, 2020

(87) PCT Pub. No.: WO2019/240810
PCT Pub. Date: Dec. 19, 2019

(65) Prior Publication Data
US 2021/0265079 A1    Aug. 26, 2021

(51) Int. Cl.
*H01B 7/02* (2006.01)
*H01B 3/44* (2006.01)
(Continued)

(52) U.S. Cl.
CPC ........... *H01B 7/0216* (2013.01); *H01B 3/445* (2013.01); *H01B 7/228* (2013.01); *H01B 19/00* (2013.01)

(58) Field of Classification Search
CPC .. H01B 7/0266; H01B 7/0241; H01B 7/0225; H01B 7/0216; H01B 7/0208;
(Continued)

(56) References Cited

U.S. PATENT DOCUMENTS 5,171,635 A * 12/1992 Randa .................. H01B 7/0208
428/383

FOREIGN PATENT DOCUMENTS

EP    0 552 277 B1    3/1995
EP    1 863 040 A2    12/2007
(Continued)

OTHER PUBLICATIONS

International Search Report and Written Opinion from International Application No. PCT/US2018/037730 dated Mar. 15, 2019.

*Primary Examiner* — Hoa C Nguyen
*Assistant Examiner* — Amol H Patel
(74) *Attorney, Agent, or Firm* — Greenberg Traurig, LLP

(57) ABSTRACT

A jacket for an elongated assembly is disclosed. The jacket, which may be a tubular shape or sheet, comprises a film layer to surround a core member of the elongated assembly, wherein the film layer has a first surface to be arranged abutting the core member in a non-bonded relationship; a braided, woven, or warp-knit layer comprising high-melt filament having a titer from 30 to 800 denier; and a bonding region between the braided, woven, or warp-knit layer and a second surface of the film layer, opposing to the first surface, to adhere at least a portion of the high-melt fibers. The jacket may further comprise an inner film layer in a non-bonded relationship with the film layer.

27 Claims, 3 Drawing Sheets

(51) Int. Cl.
*H01B 7/22* (2006.01)
*H01B 19/00* (2006.01)
*H02G 3/04* (2006.01)

(58) Field of Classification Search
CPC ........ H01B 7/188; H01B 7/183; H01B 7/182; H01B 7/18; H01B 3/445; D03D 1/0041
See application file for complete search history.

(56) References Cited

FOREIGN PATENT DOCUMENTS

EP    1863040 A2 * 12/2007   ............. H01B 7/041
WO    93/16408 A1    8/1993

* cited by examiner

ABRASION RESISTANT AND FLEXIBLE CABLE JACKET SYSTEMS

TECHNICAL FIELD

The present disclosure relates to jacket systems for elongated assemblies, such as cable assemblies. In particular, the jacket systems described herein have improved abrasion resistant and flexibility.

BACKGROUND

Protective jackets are commercially used throughout the automotive, marine, and aerospace industries to arrange and protect elongated items, such as electro-magnetic energy conductors, conduits, and other wiring. Such jackets may serve one or more of a host of functions, including providing electrical and/or thermal insulation, serving as a sheath to assist in containing multiple conductors, and providing physical protection for the conductor from damage from environmental conditions or stresses applied to the conductor during use or installation.

The commercial jacket materials generally used include polyvinyl chloride (PVC), polyurethane, polyimide, polytetrafluoroethylene (PTFE), expanded PTFE (ePTFE), fluorinated ethylene propylene (FEP), perfluoroalkoxy polymer (PFA), polyesters, silicone rubber, and nylon. These materials may be applied over the conductors in a variety of ways, including by extrusion, tape wrap, insertion within pre-formed tubes, shrink wrap, etc.

The elongated assemblies having protective jackets are often deployed in confined spaces and are subjected to forces from pulling, bending and twisting. Due to these forces there may be localized areas that become sites of mechanical failure leading to a degradation in performance. Once the jacket performance is compromised the electro-magnetic energy conductors, conduits, and other wiring protected by the jacket may become damaged. For example, in optical fibers, the damage from the jacket leads to light signal distortions or attenuation at an unacceptable levels. In digital or power elongated assemblies, damaged or compromised jackets can reduce voltage isolation of the assembly and also allow for harmful fluids to compromise the inner components of the assembly. This leads to significant down time to repair and replace elongated assemblies, including the jackets. Further, reinforcing the jackets with additional protective materials is undesirable since this increases the weight.

U.S. Pat. No. 5,519,172 discloses a jacket material comprising a silicone material that is imbibed into a porous polymer, such as expanded polytetrafluoroethylene, to produce a flexible and durable composite. When applied as a cable jacket, the composite material disclosed by U.S. Pat. No. 5,519,172 provides an improvement over the use of silicone alone, especially in the areas of load sharing, resistance to fatigue from repeated flexure, and resistance to harsh environmental conditions.

US Pub. No. 2012/0148772 discloses a coated textile sleeve for routing and protecting elongate members, combination thereof, and method of construction. The textile sleeve has an elongate knit wall constructed from weft knit yarns. The knit wall has an inner surface providing a generally tubular cavity in which the elongate members are received and protected. The inner surface is formed, at least in part, by laid-in yarn to provide a soft, non-abrasive surface for dampening contact with the elongate members being protected to facilitate absorbing vibration, which in turn, reduces the frictional wear of the elongate members being protected. Further, the knit wall has an outer surface with a flexible, impervious elastomeric coating thereon. The elastomeric coating allows the knit wall to substantially retain its flexibility as knit, provides enhanced protection against the ingress of fluid and other contaminants, and providing added dampening to absorb vibration.

The foregoing illustrates limitations known to exist in prior protective jackets for elongated assemblies. Thus, it is apparent that it would be advantageous to provide an improved cable jacket and tubing directed to overcoming one or more of the limitations set forth above.

SUMMARY

In the embodiments described herein, there is provided a jacket for an elongated assembly, the jacket comprising a film layer to surround a core member of the elongated assembly, wherein the film layer has a first surface to be arranged abutting the core member in a non-bonded relationship; a braided, woven, or warp-knit layer comprising high-melt filament having a titer from 30 to 800 denier; and a bonding region between the braided, woven, or warp-knit layer and a second surface of the film layer, opposing to the first surface, to adhere at least a portion of the high-melt fibers. In one embodiment, the jacket is a tubular member or formed by wrapping a sheet to surround the core membrane.

In another embodiment, the film layer may comprise an inner film layer that is to be disposed between the core member and film layer and is arranged in a non-bonded relationship with at least the film layer. Thus, there is provided a jacket for an elongated assembly, the jacket comprising an inner film layer surrounding a core member of the elongated assembly, an outer film layer surrounding the inner film, wherein the inner film layer and the film layer are arranged in a non-bonded relationship, a braided, woven, or warp-knit layer comprising high-melt filament having a titer from 30 to 800 denier; and a bonding region between the braided, woven, or warp-knit layer and a second surface of the film layer to adhere at least a portion of the high-melt fibers.

The jacket described herein have improvement in abrasion resistant and cut-through resistance. In one embodiment, the presence of the bonded region provides this improvement. Thus, in one embodiment there is provided a jacket for an elongated assembly, the jacket comprising a film layer; a braided, woven, or warp-knit layer comprising high-melt filament having a titer from 30 to 800 denier; and a bonding region between the braided, woven, or warp-knit layer and the film layer to adhere at least a portion of the high-melt fibers, wherein the jacket has abrasion resistance (EN3475-503) of at least 15% greater than the abrasion resistance of a jacket without a bonding region.

In another embodiment, there is provided a jacket for an elongated assembly, the jacket comprising a film layer; a braided, woven, or warp-knit layer comprising high-melt filament having a titer from 30 to 800 denier; and a bonding region between the braided, woven, or warp-knit layer and the film layer to adhere at least a portion of the high-melt fibers, wherein the jacket has a cut-through resistance (AS4373 method 703) higher than the cut-through resistance of a jacket without a bonding region. In one embodiment, the jacket has a cut-through resistance at 23° C. of at least 10% greater than the cut-through resistance of the jacket without a bonding region.

The jackets described herein are for protecting elongated assemblies. In one embodiment, there is provided an elongated assembly comprising a core member having: one or more cables; and a surrounding layer for enclosing the one or more cables; and a jacket surrounding the core member. The jacket according to this embodiment may comprise a film layer to surround the core member, wherein the core member has a first surface to be arranged abutting the core member in a non-bonded relationship; a braided, woven, or warp-knit layer comprising high-melt fibers having a titer from 30 to 800 denier; and a bonding region between the braided, woven, or warp-knit layer and a second surface of the film layer to adhere at least a portion of the high-melt fibers. In one embodiment, the film layer and the surrounding layer are arranged in a non-bonded relationship. The jacket may also comprise an inner film layer, which may be arranged in a non-bonded relationship with the film layer.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The present invention will now be described by way of example with reference to the following drawings in which.

DETAILED DESCRIPTION

In general the embodiments of the present disclosure provide an improved protective jacket suitable for covering a wide variety of elongated assemblies, such as electromagnetic energy conductive materials, electrically conductive cables transmitting electrical signals, fiberoptic cables transmitting light signals, and others. As described herein the protective jackets have improved flexibility and are abrasion resistant. Elongated assemblies are often routed in tight or confined spaces, and therefore require flexibly and tight bend radii. Due to the tortuous deployment of the elongated assemblies, jackets often experience twisting or bending. One advantage of the disclosed protective jackets is that aspects of their construction cause a reduction in wrinkling when bent. Jacket failure is likely to occur in the areas of jacket wrinkles, thus reducing the prevalence of wrinkles, preferably eliminating the wrinkles, improves the performance and lifetime of the jacket system. The substantial resistance to wrinkling when bent is combined with a low force to plastic deformation, which reduces springback force. The construction of the jacket systems described herein provides improved flexibility by having a low springback force and low force to bend.

The jacket systems described herein provide a significant advantage for aerospace applications that often use several meters of cable assemblies, where reduced weight is a concern, and where improved flexibly and abrasion resistance is desirable. In particular, aerospace applications expose the jackets to repeated vibrations and rapidly changing environment conditions.

Due to the robust nature of the jacket systems described herein no further outer protective sleeves or sheaths are needed to provide performance characteristics, such as abrasion resistance. Eliminating the need for further protective sleeves reduces the overall weight and makes the jackets more readily deployable in a variety of applications.

Figure 1:
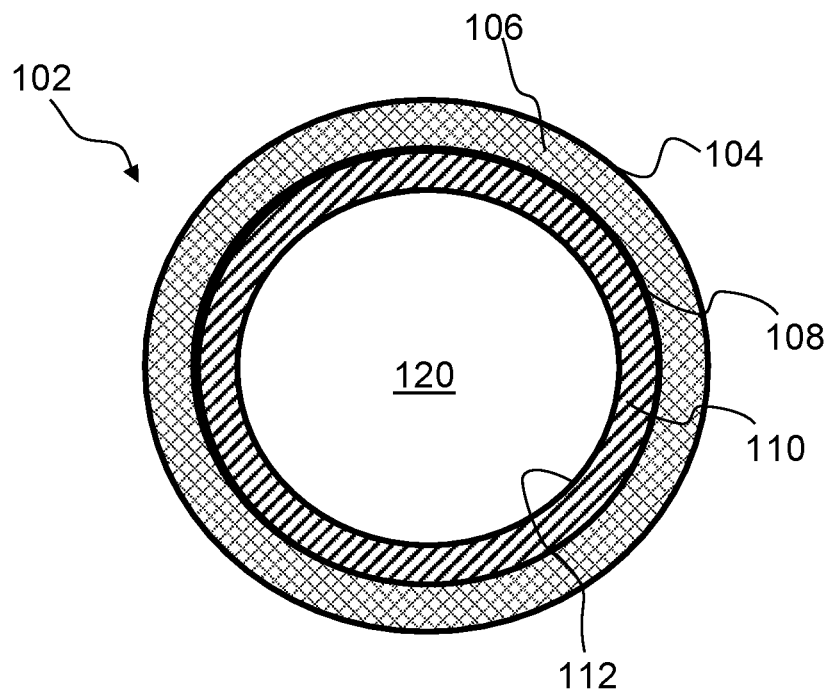
FIG. 1 is a cross-sectional view of jacket having a film layer to surround a core member in accordance with an embodiment described herein.

One embodiment of a jacket 102 is shown in FIG. 1. Jacket 102 is formed of a layer 104 made from a plurality of filaments 106. A portion of the filaments 106 are adhered by bonding region 108 to a film layer 110. Film layer 110 surrounds a core member 120 and provides insulation. Without limiting the embodiments described herein, the core member 120 may be for signal or power transmission. The bonding region 108 secures and prevents loose filaments, i.e. fraying, and improves stress and abrasion resistance. Loose filaments are observed to create stress risers leading to localize mechanical failure. In one embodiment, the abrasion resistance of the jacket 102 is at least 15% greater, e.g., 25% greater or 40% greater, than that of a jacket without the bonding layer. Abrasion resistance is measured by EN3475-503. In addition, the bonding layer 108 also provides additional cut-through resistance as measured by AS4373 method 703. In one embodiment, the jacket has a cut-through resistance higher than the cut-through resistance of a jacket without a bonding region. At higher temperatures, there may be smaller relative improvements in cut-through resistance but the improvements demonstrate the overall continued stability. In one embodiment, the cut-through resistance for jacket 102 at 23° C. of at least 10% greater, e.g. 15% greater, than a jacket without the bonding layer. Further examples provided herein demonstrate the improved performance of the disclosed jackets.

In addition to abrasion performance and cut-through resistance, the jackets described herein also have resistance to compression, and are able to repeatedly withstand high temperature conditions, in excess of 250° C., without degradation in performance.

The size of the jacket 102 is not particularly limited by the embodiments disclosed herein and is typically employed to encase elongated assemblies having a maximum diameter of 10 cm. Although the jacket 102 in FIG. 1 is shown as a tubular structure, the jacket may be used with flat cables and has a rectangular-shaped cross-section. In some embodiments the jacket may be a sheet that is wrapped in a spiral or helical manner around an elongated assembly, or may be formed by co-extrusion of one or more layers onto an elongated assembly.

Filaments 106 used for layer 104 are preferably high-melt filaments. In one embodiment the filaments 106 are made of a material having a melting temperature greater than 180° C. High-melt temperature materials are particularly suited for bonding the filaments to the film layer using plasma and heating techniques. The filaments 106 may comprise monofilaments or multifilaments. The filaments as used herein may also include various fibers. Suitable materials include high-melt filaments having a titer from 30 to 800 denier, i.e. from 30 to 600 denier or from 45 to 200 denier. Materials with lower denier of 200 or less, or 100 or less, may further assist in reducing the weight of the jacket. The materials may be heat resistant for extreme applications. These materials may be formed from fluoropolymers, polyamides, polyesters, ultra-high molecular weight polyethylene (UHMWPE), meta-aramids, para-aramids, or combinations and mixtures thereof. In one embodiment, the filaments may comprise commercially available materials such as expanded polytetrafluoroethylene, nylon 6, nylon 6,6, RasTex™ (from W. L. Gore), Kelvar™ or Nomex™ (both from E.I. du Pont de Nemours).

In one embodiment at least some of the filaments may be fluoropolymer materials that are composed of tetrafluoroethylene (TFE) based polymers of various degrees of density and porosity such as porous PTFE. These fluoropolymer filaments may be sized, treated, coated, or imbibed with agents to augment processing and/or adhesion.

The filaments 106 may be braided, woven, or warp-knitted to form layer 104. Any suitable braid, weave or warp-knit pattern may be employed according to various embodiments described herein. In some embodiments, the pattern may be a herringbone or chevron.

In various embodiments, the layer 104 is the outermost layer of the jacket 102. Layer 104 is not covered or coated with another layer, film, membrane, etc. When in use, layer 104 will be exposed to the environment. To further prevent intrusion of objects through layer 104, the open space between filaments 106 is very small and filaments 106 may be overlapping to further eliminate open space. Eliminating open space between the filaments 106 can also prevent the bonding region 108 from passing through layer 104.

The adhesive for the bonding region 108 may include fluorinated ethylene propylene (FEP), perfluoroalkoxy polymer (PFA), silicone adhesives or other suitable adhesives. In general, the adhesive is desirably a high melt adhesive having a melting point above 180° C. The bonding region 108 may be formed in a discontinuous manner in the form of lines, dots, grids or pattern on the film layer 110 and/or layer 104. In one embodiment, the bonding region 108 may include adhesive filaments that are incorporated into layer 104.

The film layer 110 functions to provide current-limiting insulation over a wide operating temperature, e.g. from −65° C. to 200° C. The film layer may be opaque, transparent, or translucent. Suitable materials include fluoropolymers, polyimides, polyamides, UHMWPE, and combinations thereof. Commercially available materials include Kapton (from DuPont), or Gore (from WL Gore). Silicone materials are not used for the film layer 110 because silicone lacks the desired vapor permeability properties.

In one exemplary embodiment, the film layer 110 may include an expanded polytetrafluoroethylene (ePTFE) membrane, such as an unfilled or nonimbided ePTFE membrane. Materials that provide good signal quality of the conductors within the core members are particularly useful. ePTFE is particularly suited for the film layer 110 because of its low arc track properties, low coefficient of friction, low water absorption, low flammability, low weight, good chemical resistance, good abrasion resistance, and high thermal resistance. In one embodiment, the ePTFE membrane for film layer 110 may have matrix tensile strengths ranging from 50 MPa to 400 MPa, based on a density of about 2.2 g/cm$^3$ for ePTFE.

In one embodiment, the ePTFE membrane for the film layer 110 may be a composite layer of a fluoropolymer and a thermoplastic. The thermoplastic that is combined with the ePTFE is a thermoplastic copolymer of tetrafluoroethylene (TFE) and perfluoromethyl vinyl ether (PMVE), such as described in U.S. Pat. No. 7,462,675.

To balance the performance of the film layer within weight considerations, the film layer 110 may have a thickness from 0.010 mm to 5 mm, e.g., from 0.01 to 1 mm or from 0.03 mm to 0.5 mm. In some embodiments, the film may be extruded onto the elongated assembly and the filaments bonded to the film.

In various applications, such as aircraft, at some point the elongated assembly will become exposed to liquids. In some embodiments, the film layer 110 may be constructed of a material that provides a fluid barrier element, i.e. that is water impermeable, water resistant, or nonporous to liquid. This fluid barrier element provides resistance to moisture and chemical intrusion when the jackets are exposed to water, lubricants, hydrocarbons, gasoline or other chemicals. Having the fluid barrier element reduces the adverse effects caused by exposure to liquids, including delamination or reduction in electrical properties.

As shown in FIG. 1, the film layer 110 is bonded to the filaments 106 on one surface and has an opposing inner surface 112. Inner surface 112 is a non-bonding surface, which means that the inner surface is not affixed to any inner layer or core member. A non-bonding surface allows the jacket to slide or move in relation to the inner layer or core member. The non-bonding surface provides a de-coupled relationship between the jacket 102 and core member 120 that contributes to the improvement in flexibility and reduction in wrinkles.

Figure 2:
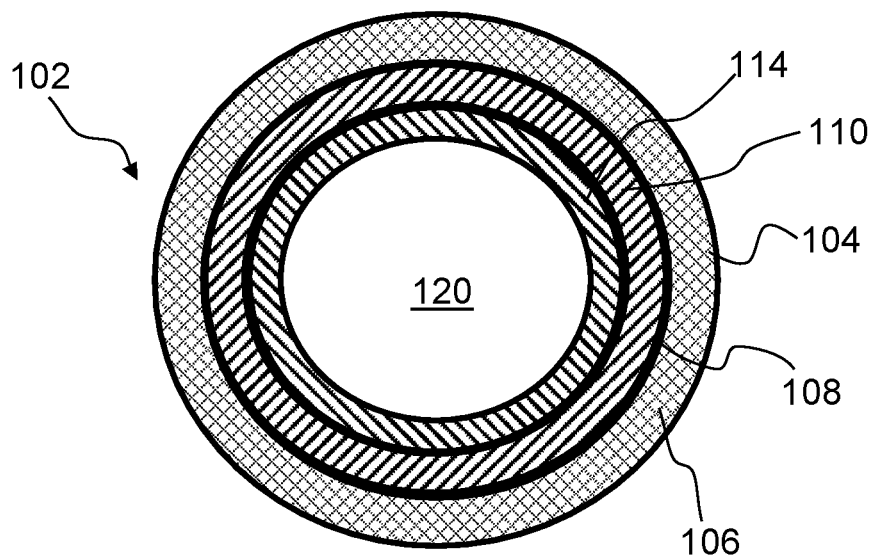
FIG. 2 is a cross-sectional view of jacket having an inner film layer in a non-bonded relationship with film layer in accordance with another embodiment described herein.

In one embodiment, there is provided an inner film layer 114 shown in FIG. 2 that is in a non-bonded relationship with at least the film layer 110. There is a low coefficient of friction between inner film layer 114 and film layer 110. For purposes of the present disclosure, the jacket 102 may include the inner film layer 114. The inner film layer 114 surrounds the core member 120 of the elongated assembly and is disposed between the core member 120 and film layer 110. For applications where the jacket 102 is subjected to temperature extremes, an inner film layer 114 may be desirable to achieve high performance. Suitable materials for the inner film layer include fluoropolymers, polyimides, polyamides, UHMWPE, and combinations thereof. In one embodiment, the inner film layer 114 may be constructed of a similar material as the film layer 110. To balance the performance with weight considerations, the inner film layer 114 may have a thickness from 0.010 mm to 5 mm, e.g., from 0.01 to 1 mm. On the surface opposite of the film layer 110, the inner film layer 114 may be bonded or otherwise fixed to a portion of the core member 120. In other embodiment, the inner surface of the inner film layer 114 may also be in a non-bonded relationship with the core member 120. In such embodiments, the inner film layer 114 may move independent of core member 120 and film layer 110.

Figure 3:
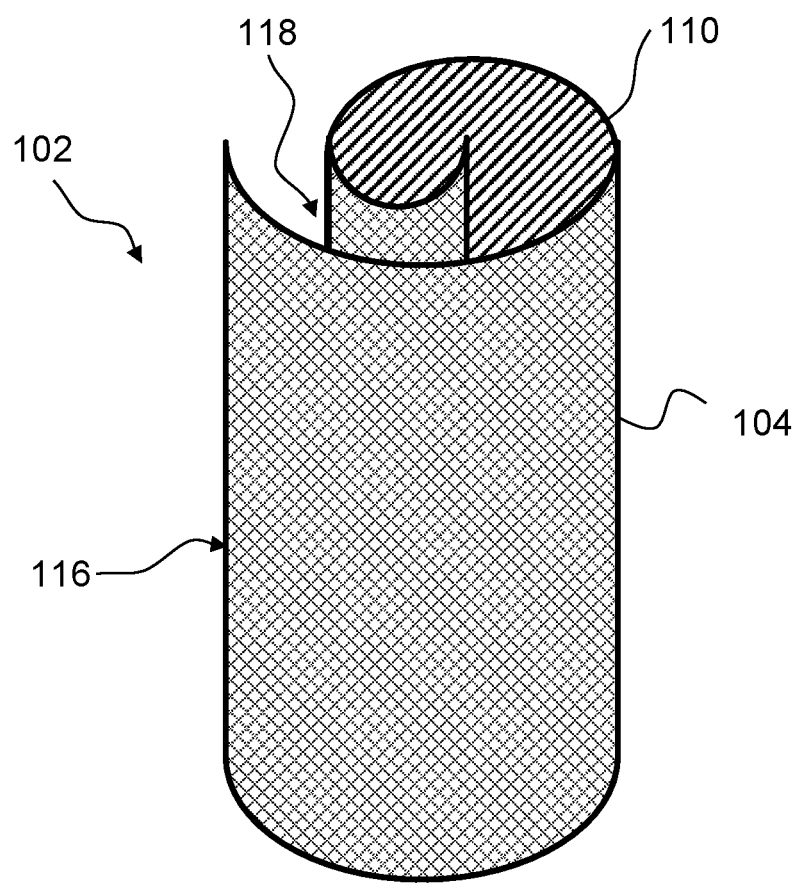
FIG. 3 is a cross-sectional view of a sheet wrapped to form a jacket in accordance with an embodiment described herein.

As shown in FIGS. 1 and 2, the jackets are constructed as tubular members. In other embodiments, the jacket may be formed from a sheet 116 as shown in FIG. 3 that is biased around a core member (not shown) by wrapping the sheet 116 to surround the core member. The sheet 116 includes layer 104 bonded to film layer 110 as described above. This arrangement allows the jacket 102 to be used to retrofit elongated members. Repairs or replacement of protective coverings may be done quickly by simply biasing the sheet 116 around the core member. Additionally the sheet 116 may also be biased around existing protective coverings that are damaged without having to remove the damaged protective coverings.

In some embodiments, the sheet 116 may be wrapped in a spiral manner or wrapped longitudinally along the length of the core member. As shown in FIG. 3, the sheet 116 can be wrapped to produce an overlap region 118 in which inner surface of the film layer 104 is adjacent to the outer surface of layer 104. Sheet 116 may be resiliently biased to hold the tubular configuration or an adhesive may be used to maintain the desired configuration.

Alternatively, the sheet 116 may be wrapped in such a manner that the edges are adjoined together without an overlapping region. A suitable tape or sealing member may be used to join the edges.

Figure 4:
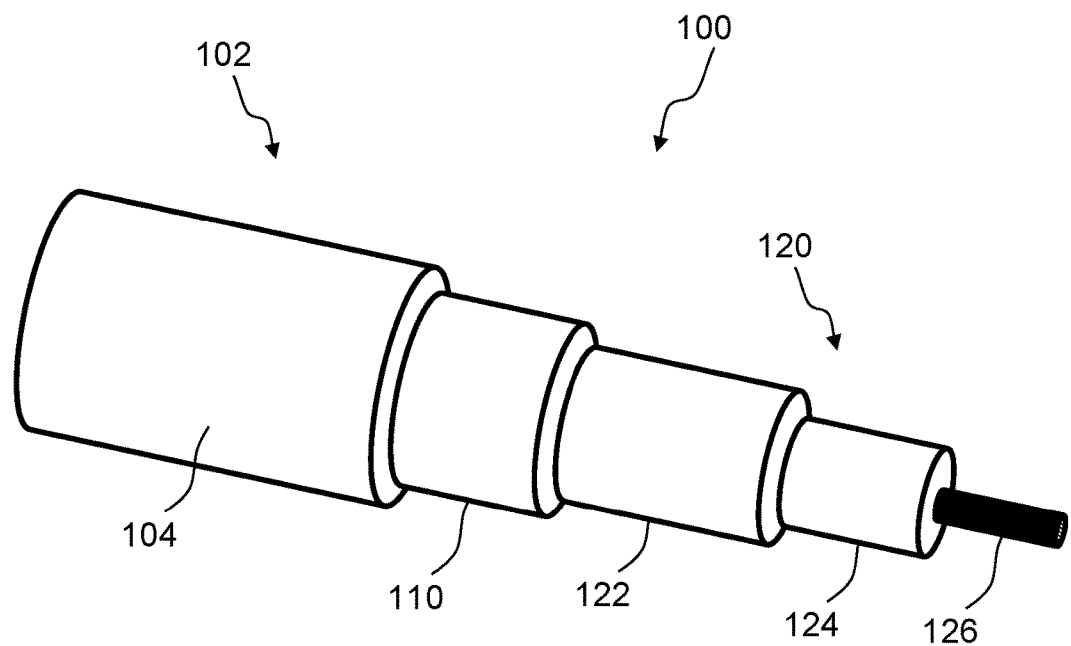
FIG. 4 is a three-quarter isometric view of an elongated assembly having a jacket surrounding a core member in accordance with an embodiment described herein.

FIG. 4 shows an elongated assembly 100 comprising a jacket 102 of FIG. 1 surrounding core member 120. In other embodiments, a jacket 102 of FIG. 2 may also be used. The core member 120 may vary depending on the application and a variety of core members may be used. For purposes of illustration, an exemplary core member is shown in FIG. 4. Core member 120 includes a surrounding layer 122, a material layer 124 and one or more conductors 126. It should be understood that other layers and components may be used in the core member 120 without departing from the scope of the embodiments described herein. The surrounding layer 122 may be a shield layer or strength member. The surrounding layer 122 can include a foil, metal braided shield, an aluminized polyimide shield, a polyimide shield, or combinations thereof, and may be used to dissipate EMI/RFI. In one embodiment, film layer 110 surrounds the core surrounding layer 122 in a non-bonded relationship. The material layer 124 may be a dielectrical material. The one or more conductors 126 may include optical fibers, electrical conductors, coaxial cables, pairs, wires, or combinations thereof. The conductors 126 can also include an array of fibers or wires.

Figure 5:
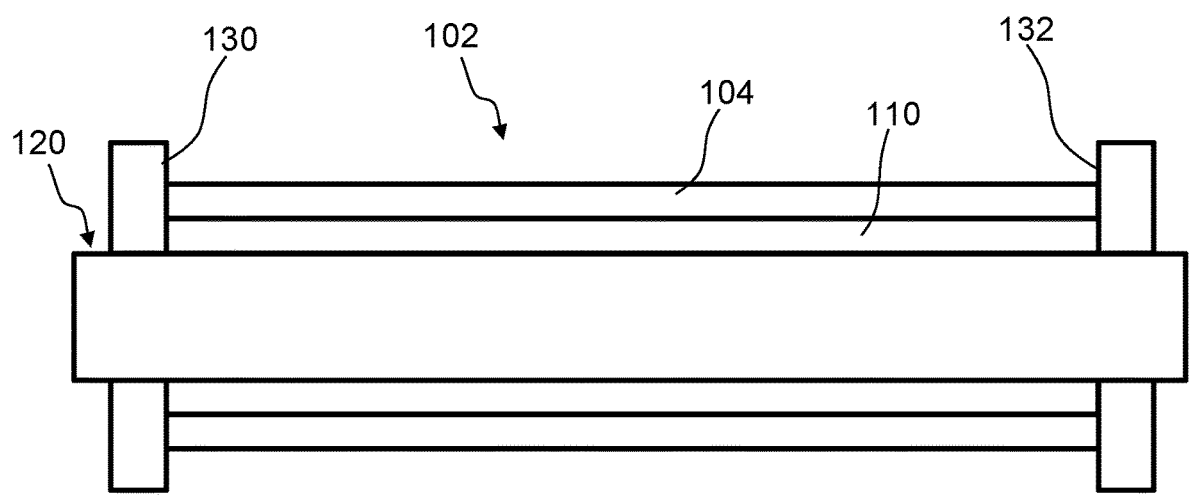
FIG. 5 is a side view of an elongated assembly having end connectors in accordance with an embodiment described herein.

Each terminus of the jacket can include respective end connectors 130, 132 as shown in FIG. 5. The end connectors 130, 132 may be stainless steel connectors that are affixed to the outer surface of layer 104. An epoxy adhesive may be used for the end connectors 130, 132. In other embodiments, the jacket can be terminated using epoxies, heat shrink tubing, or mechanical methods (clamps or backshell screws on the connectors).

Without intending to limit the scope of the present disclosure, the following examples illustrate how the present invention may be made and used.

EXAMPLES

Example 1

A jacket, as shown in FIG. 2, was constructed using a 90 Denier PTFE filament is bonded with fluorinated ethylene propylene (FEP) to a film layer of PTFE film and an inner film layer of PTFE film arranged in a non-bonded relationship with the film layer. The FEP adhesive was applied as discontinuous dots to the PTFE filament and then adhered to the inner film. The jacket is formed as a tubular member for an elongated assembly having a silver-plated copper braid as a surrounding layer for the core member. The inner film layer is adjacent to the silver-plated copper braid. When bent, the jacket of example 1 is substantial resistance to wrinkling.

Comparative Example A

To demonstrate the performance of the bonding region, a comparative example was made similar to Example 1 except no bonding region was provided. The unbonded filaments were directly adjacent to the film layer.

Abrasion Resistance

Example 1 and comparative example A were separately tested at different temperatures under EN3475-503 at 1.2 daN load. The number of cycles until failure is reported in Table 1. The mean average of six tests are reported at two different temperatures. Table 1 provides a summary of the abrasion results. A significant improvement is shown at both temperatures.

TABLE 1

| Temperature | Example 1 | Comp. Ex. A | % Improvement |
| --- | --- | --- | --- |
| 30° C. | 7860 | 3555 | 55% |
| 55° C. | 13533 | 10190 | 25% |

Cut-Through Resistance

In addition to abrasion resistance, Example 1 also demonstrates an improvement in cut-through resistance or dynamic cut through. Testing for cut-through resistance is performed per AS4373 method 703 which uses a blunt edge is pressed into the example until breach and the values are reported in lbf. The mean average of five tests are reported at increasing temperatures. Table 2 provides a summary of the results. A significant improvement over the unbonded comparative is shown at 23° C., which indicates the jacket of example 1 has an improved ability to resist physical damage. At higher temperatures, such as 70° C., the jacket of example 1 continued to show improvement over the comparative example. The smaller relative improvement at higher temperatures continues to demonstrate the stability of example 1 over a wide temperature range. The improvement at higher temperatures may be attributable to the stability of the adhesive used for the bonding region.

TABLE 2

| Temperature | Example 1 (lbf) | Comp. Ex. A (lbf) | % Improvement |
| --- | --- | --- | --- |
| 23° C. | 328 | 244 | 26% |
| 70° C. | 206 | 201 | 2% |
| 150° C. | 201 | 172 | 14% |

Various modifications and additions can be made to the exemplary embodiments of the disclosed treatment systems discussed without departing from the scope of the present invention. While the embodiments described above refer to particular features, the scope of this invention also includes embodiments having different combinations of features and embodiments that do not include all of the above described features. It will be appreciated that features of the various embodiments and examples described herein may be combined with one another in any suitable combination and that the disclosed embodiments are not limiting. For example, features in one embodiment may optionally be imported into another embodiment if it is possible to do so.

What is claimed is:

1. A jacket for an elongated assembly, the jacket comprising:
    a film layer configured to surround a core member of the elongated assembly,
        wherein the film layer has a first surface and an opposing second surface,
        wherein the first surface faces the core member,
        wherein the first surface is not bonded to the core member;

a braided, woven, or warp-knit layer comprising a high-melt filament,
wherein the high-melt filament has a titer from 30 to 800 denier; and
a bonding layer positioned between the braided, woven, or warp-knit layer and the second surface of the film layer,
wherein the bonding layer is configured to adhere at least a portion of the high-melt filament to the second surface of the film layer;
wherein the bonding layer does not pass through the braided, woven, or warp-knit layer.

2. The jacket of claim 1, wherein the jacket is a tubular member or formed by wrapping a sheet to surround the core member.

3. The jacket of claim 1, further comprising an inner film layer, wherein the inner film layer is to be disposed between the core member and film layer.

4. The jacket of claim 3, wherein the inner film layer and the film layer are arranged in a non-bonded relationship.

5. The jacket of claim 3, wherein the inner film layer comprises a fluoropolymer, a polyimide, polyamide, or UHMWPE.

6. The jacket of claim 3, wherein the inner film layer is a current-limiting insulation and fluid barrier element.

7. The jacket of claim 3, wherein the inner film layer has a thickness from 0.010 mm to 5 mm.

8. The jacket of claim 1, wherein the film layer comprises a fluoropolymer, a polyimide, polyamide, or UHMWPE.

9. The jacket of claim 1, wherein the film layer has a thickness from 0.010 mm to 5 mm.

10. The jacket of claim 1, wherein the high-melt filament comprises fluoropolymer fibers, polyamide fibers, polyester fibers, UHMWPE, meta-aramids, or para-aramids.

11. The jacket of claim 1, wherein the high-melt filament having a titer from 45 to 600 denier.

12. The jacket of claim 1, wherein the bonding layer comprises one or more of a fluorinated ethylene propylene (FEP), perfluoroalkoxy polymer (PFA), or a silicone adhesive.

13. The jacket of claim 1, wherein the high-melt filament is bonded to the film layer using at least one of plasma or heat.

14. The jacket of claim 1, wherein the jacket is flexible and has a low force to plastic deformation.

15. The jacket of claim 1, wherein the braided, woven, or warp-knit layer comprises an outer surface that is resistant to wrinkling when the jacket is assembled with the elongated assembly and bent.

16. The jacket of claim 1, wherein the jacket has an abrasion resistance of at least 15% greater than the abrasion resistance of a jacket without a bonding layer.

17. The jacket of claim 1, wherein the jacket has a cut-through resistance higher than the cut-through resistance of a jacket without a bonding layer.

18. The jacket of claim 1, wherein the jacket has a cut-through resistance at 23° C. of at least 10% greater than the cut-through resistance of a jacket without a bonding layer.

19. A jacket for an elongated assembly, the jacket comprising:
a film layer;
a braided, woven, or warp-knit layer comprising a high-melt filament having a titer from 30 to 800 denier; and
a bonding layer between the braided, woven, or warp-knit layer and the film layer,
wherein the bonding layer is configured to adhere at least a portion of the high-melt filament to the film layer,
wherein the bonding layer does not pass through the braided, woven, or warp-knit layer;
wherein the jacket has abrasion resistance of at least 15% greater than the abrasion resistance of a jacket without a bonding layer.

20. A jacket for an elongated assembly, the jacket comprising:
a film layer;
a braided, woven, or warp-knit layer comprising a high-melt filament having a titer from 30 to 800 denier; and
a bonding layer between the braided, woven, or warp-knit layer and the film layer,
wherein the bonding layer is configured to adhere at least a portion of the high-melt filament to the film layer,
wherein the bonding layer does not pass through the braided, woven, or warp-knit layer;
wherein the jacket has a cut-through resistance higher than the cut-through resistance of a jacket without a bonding layer.

21. The jacket of claim 20, wherein the jacket has a cut-through resistance at 23° C. of at least 10% greater than the cut-through resistance of the jacket without a bonding layer.

22. An elongated assembly comprising:
a core member comprising:
one or more cables; and
a surrounding layer for enclosing the one or more cables; and
a jacket surrounding the core member,
wherein the jacket comprises:
a film layer configured to surround the core member, wherein the film layer has a first surface abutting the core member in a non-bonded relationship;
a braided, woven, or warp-knit layer comprising high-melt fibers having a titer from 30 to 800 denier; and
a bonding layer between the braided, woven, or warp-knit layer and a second surface of the film layer,
wherein the bonding layer is configured to adhere at least a portion of the high-melt fibers to the second surface of the film layer
wherein the bonding layer does not pass through the braided, woven, or warp-knit layer.

23. The elongated assembly of claim 22, wherein the film layer and the surrounding layer are arranged in a non-bonded relationship.

24. The elongated assembly of claim 22, wherein the one or more cables comprise optical fibers, conductors, coaxial cables, pairs or combinations thereof.

25. The elongated assembly of claim 22, wherein the surrounding layer is an electromagnetic energy shielding layer.

26. The elongated assembly of claim 25, wherein the shielding layer comprises a metal braided shield, an aluminized polyimide shield, a polyimide shield, or combinations thereof.

27. The elongated assembly of claim 22, wherein the surrounding layer is a strength membrane.

* * * * *